United States Patent [19]

McLynn

[11] Patent Number: 4,484,018

[45] Date of Patent: Nov. 20, 1984

[54] COAXIAL THERMOCOUPLE WIRE

[75] Inventor: Dennis M. McLynn, Trevor, Wis.

[73] Assignee: Pneumo Corporation, Boston, Mass.

[21] Appl. No.: 459,324

[22] Filed: Jan. 20, 1983

[51] Int. Cl.³ ............................................. H01L 35/02
[52] U.S. Cl. .................................... 136/230; 136/233; 136/235; 136/242
[58] Field of Search ............... 136/230, 233, 234, 242, 136/235

[56] References Cited

U.S. PATENT DOCUMENTS

| | | | |
|---|---|---|---|
| 2,979,951 | 4/1961 | Pircon | 136/233 X |
| 3,449,174 | 6/1969 | Kleinle | 136/228 |
| 3,819,420 | 6/1974 | Schmidt et al. | 136/230 |
| 3,845,706 | 11/1974 | Strimple et al. | 136/230 X |
| 3,890,162 | 6/1975 | Dawson et al. | 136/230 |
| 4,164,433 | 8/1979 | Granahan et al. | 136/229 |
| 4,243,402 | 1/1981 | Sensi | 136/234 X |

Primary Examiner—Leland A. Sebastian
Attorney, Agent, or Firm—Maky, Renner, Otto & Boisselle

[57] ABSTRACT

A flexible coaxial thermocouple wire comprising an insulated inner thermoelement and a braided outer thermoelement surrounding the insulation covering the inner thermoelement. The braided outer thermoelement, in addition to forming one conductor of a thermocouple pair, also serves to protect and contain the insulation. Also encompassed is the formation of a thermojunction at one end of the coaxial thermocouple wire and connection of a termination to the other end.

11 Claims, 4 Drawing Figures

COAXIAL THERMOCOUPLE WIRE

This invention relates generally to a coaxial thermocouple wire and associated thermojunction and termination.

As utilized herein, a "thermoelement" is one conductor of a pair of dissimilar conductors which may be joined to form a thermocouple. Accordingly, a "thermocouple pair" comprises two "thermoelements" made of different thermoelectric materials.

BACKGROUND

Thermocouple wire traditionally is composed of two separate wire conductors, each wire conductor being one thermoelement of a thermocouple pair. Each wire conductor generally is insulated by some form of insulating material to separate it from the other wire conductor and to provide some protection from the surrounding environment. The insulated wire conductors may be twisted together to form the thermocouple pair, but more typically both wire conductors are contained by an overall covering or jacket of some additional insulating and/or protective material. The outer layer or jacket not only combines the two insulated wire conductors into the thermocouple pair, but also serves to protect the underlying insulations. As will be appreciated, each layer of insulation and/or protective covering applied to the thermocouple pair adds significantly to the size and cost of the completed wire.

It is also known to provide a thermocouple wire having an outer metal sheath containing densely compacted ceramic insulation and a wire conductor embedded within the ceramic insulation, with the wire conductor and outer metal sheath being used as respective thermoelements of a thermocouple pair. One such type of thermocouple wire or cable is sold under the trademark XACTPAK by the Claud S. Gordon Company, Richmond, Ill. Typically, such cable, although bendable, is relatively stiff and cannot be sharply bent without significantly disrupting the ceramic insulation.

SUMMARY OF THE INVENTION

The present invention provides a flexible coaxial thermocouple wire which is relatively small in size, inexpensive and easy to fabricate due to fewer operations and less material consumption. Briefly, the thermocouple wire comprises an insulated inner thermoelement and a braided outer thermoelement surrounding the insulation covering the inner thermoelement. The braided outer thermoelement, in addition to forming one conductor of a thermocouple pair, also protects and contains the insulation which may for example be easily disturbed, loose fiber insulation. The wire also may have an outer insulating and/or protective jacket covering the braided outer thermoelement.

The present invention also encompasses the formation of a thermojunction at one end of the coaxial thermocouple wire and connection of a termination to the other or cold junction end of the wire. The inner thermoelement and braided outer thermoelement may be joined together upon removal of a portion of the inner insulation therebetween by twisting the braided outer thermoelement tightly around the inner thermoelement to form the thermojunction. For a thermojunction of greater integrity, the twisted wire braid of the outer thermoelement can be either welded or brazed to the inner thermoelement. At the wire end opposite the thermojunction, the insulated inner thermoelement may be pulled through the wire braid of the outer thermoelement and stripped of insulation for connection to one terminal of the termination with the then empty braided wire strands of the outer thermoelement being twisted and secured to the other terminal.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
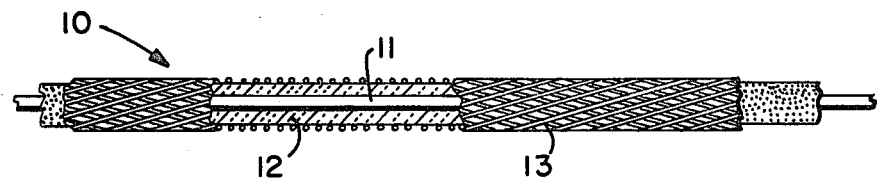
FIG. 1 is a fragmented plan view, partially broken away and in section, of a coaxial thermocouple wire according to the invention.

Referring now in detail to the drawing and initially to FIG. 1, a coaxial thermocouple wire according to the invention is designated generally by reference numeral 10. As shown, the wire 10 comprises an inner wire conductor 11 covered by a layer of insulation 12 which is in turn surrounded by an outer braid of conductive wire strands 13. The inner wire conductor 11 and outer braid 13 respectively form the two thermoelements of a thermocouple pair and, accordingly, are made of dissimilar but compatible thermoelectric materials. The size of each individual strand of the outer braided thermoelement 13 need only be compatible with the braiding operation and the overall size of the braid compatible with the size of the inner wire conductor 11 which may be of conventional size and type.

In addition to forming one of the two thermoelements of a thermocouple pair, the outer braid 13 assists in protecting and containing the insulation 12 which for example may consist of easily disturbed, loose glass fiber insulation which is particularly suitable for high temperature use applications. The braid in effect acts as a binder for holding the loose glass fiber in place. However, it should be noted that any suitable electrically insulating material may be used as the insulation and applied in any wall thickness compatible with the thermoelements being separated thereby.

Figure 2:
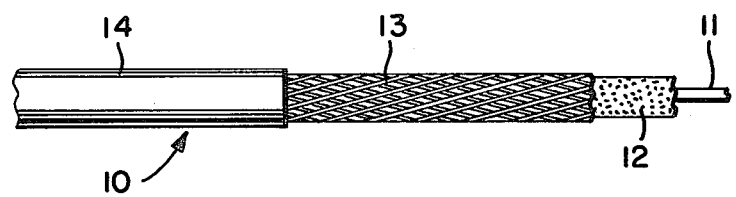
FIG. 2 is a fragmented plan view, partly broken away, of the coaxial thermocouple wire with an outer jacket.

Depending on use requirements, an outer jacket or covering 14 may also be provided over the braided thermoelement 13 as seen in FIG. 2. Such jacket may be a layer of insulating material and serves to electrically insulate and/or protect the braided thermoelement from the exterior environment. Also, the jacket may be used to provide thermocouple wire coding information for identification purposes.

Figure 3:
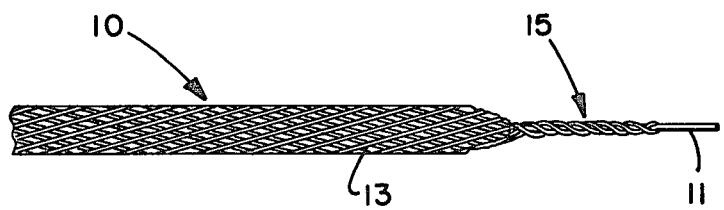
FIG. 3 is a fragmented plan view showing a thermojunction formed at one end of the coaxial thermocouple wire.

Referring now to FIG. 3, a hot or measuring junction formed at one end of the thermocouple wire 10 is indicated at 15. The measuring junction 15 can be easily formed by flaring back the braided thermoelement 13 at one end of the wire to permit removal of an end portion of the insulation 12. Then the end of the braided thermoelement free of insulation can be twisted tightly around the bare end of the inner thermoelement or wire conductor 11 as shown. For a thermojunction of greater integrity, the twisted wire braid can be either welded or brazed to the inner wire conductor.

Figure 4:
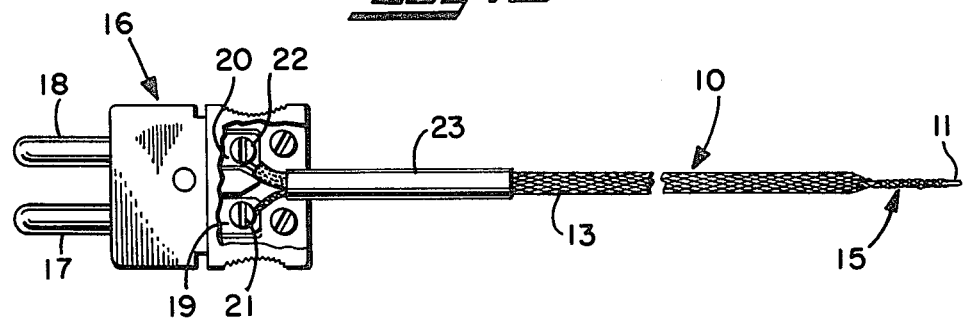
FIG. 4 is a fragmented plan view, partly broken away, showing a termination connected to the wire end opposite the thermojunction.

As seen in FIG. 4, the other or cold junction end of the thermocouple wire 10 opposite the measuring junction 15 may be connected to a termination 16. Any convenient termination can be used in conjunction with the wire such as the illustrated plug having prongs 17 and 18 and associated terminals 19 and 20 to which the inner and outer thermoelements 11 and 13 are connected, respectively. To effect such connection, the insulated inner thermoelement 11 and inner insulation 12 can be passed through the braided thermoelement 13 at some distance from the end of the braided thermoelement to provide a free end portion thereof and an empty end portion of the braided thermoelement 13. After withdrawal from the braid 13, the emergent end of the inner thermoelement 11 then can be stripped of its insulation for connection to the terminal 20 by a suitable fastener 22 and the empty end of the braided thermoelement 13 twisted and connected to the other terminal 19 by a fastener 21. If desired, the separated end portions of the insulated inner thermoelement 11 and braided outer thermoelement 13 may be held together for a portion of their length by a short tubular sleeve 23 fitted thereover to provide stress relief at the wire termination junction.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. A coaxial thermocouple wire comprising an inner thermoelement, a layer of insulation covering said inner thermoelement, and a braided outer thermoelement surrounding said insulation covering said inner thermoelement, said inner thermoelement and braided outer thermoelement being joined at one end of said wire to form a measuring junction.

2. A thermocouple wire as set forth in claim 1, further comprising an outer insulating jacket covering said braided outer thermoelement.

3. A thermocouple wire as set forth in claim 1, wherein said insulation consists of a layer of loose fiber insulating material contained and protected by said braided outer thermoelement.

4. A thermocouple wire as set forth in claim 1, wherein said braided outer thermoelement is twisted tightly around said inner thermoelement at said measuring junction.

5. A thermocouple wire as set forth in claim 1, wherein said insulated inner thermoelement, at the end of said wire opposite said measuring junction, extends through and emerges from said braided outer thermoelement for connection to a termination.

6. A thermocouple wire as set forth in claim 5, wherein the emergent end of said insulated inner thermoelement is stripped of insulation and connected to one terminal of said termination, and the end of said braided outer thermoelement extending beyond such emergent end is connected to another terminal of said termination.

7. A coaxial thermocouple wire comprising an inner wire conductor, a layer of insulation covering said inner wire conductor, and a braid of conductive wire strands closely surrounding and containing said insulation, said inner conductor and wire strands being made of dissimilar thermoelectric materials suited for joinder to form a thermojunction, said inner conductor and wire strands being joined at one end of said inner conductor to form said thermojunction.

8. A thermocouple wire as set forth in claim 7, further comprising an outer insulating jacket covering said braid of conductive wire strands.

9. A thermocouple wire as set forth in claim 4, wherein said braided outer thermoelement is welded or brazed to said inner thermoelement at said measuring junction.

10. A thermocouple wire as set forth in claim 7, wherein said insulated inner wire conductor, at the end opposite said thermojunction, extends through and emerges from said braid of conductive wire strands for connection to a termination.

11. A thermocouple wire as set forth in claim 10, wherein the emergent end of said insulated inner wire conductor is stripped of insulation and connected to one terminal of said termination, and the end of said braid of conductive wire strands extending beyond such emergent end is connected to another terminal of said termination.

* * * * *